United States Patent [19]

Stahler

[11] Patent Number: 4,564,823
[45] Date of Patent: Jan. 14, 1986

[54] FRACTIONAL-CYCLE TIME/AMPLITUDE MODULATION

[75] Inventor: John P. Stahler, San Diego, Calif.
[73] Assignee: Robot Research, Inc., San Diego, Calif.
[21] Appl. No.: 653,150
[22] Filed: Sep. 24, 1984
[51] Int. Cl.[4] .......................... H03C 5/00; H03D 5/00
[52] U.S. Cl. .................................... 332/17; 329/126; 329/135; 332/23 R; 375/42
[58] Field of Search ...................... 332/16 R, 16 T, 17, 332/23 R, 30 V; 329/110, 126, 128, 135; 455/61, 214, 337; 375/42, 82, 80, 94

[56] References Cited

U.S. PATENT DOCUMENTS

| | | | |
|---|---|---|---|
| 3,146,307 | 8/1964 | Renshaw | 178/88 |
| 3,454,718 | 7/1969 | Perreault | 178/66 |
| 3,566,033 | 2/1971 | Young | 178/66 |
| 3,623,075 | 11/1971 | Bench et al. | 340/347 DD |
| 3,699,254 | 10/1972 | Nailen | 178/66 R |
| 3,828,279 | 8/1974 | Labarber et al. | 332/2 |
| 4,059,806 | 11/1977 | Vagt, Jr. | 329/107 |
| 4,066,841 | 1/1978 | Young | 178/66 R |
| 4,136,258 | 1/1979 | Workman | 178/68 |
| 4,206,316 | 6/1980 | Burnsweig et al. | 178/66.1 |
| 4,244,004 | 1/1981 | Yamada | 358/138 |
| 4,317,130 | 2/1982 | Brown | 358/108 |

FOREIGN PATENT DOCUMENTS

2066008 7/1981 United Kingdom ............ 332/16 R

Primary Examiner—Siegfried H. Grimm
Attorney, Agent, or Firm—Baker, Maxham, Callan & Jester

[57] ABSTRACT

A modulation system wherein a carrier signal is modulated by an input signal having a variable amplitude, either analog or digital. The amplitude of the input signal is sampled every predetermined fractional cycle of the modulated signal; and the carrier signal is modulated in response to the sampled amplitude of the input signal to provide a modulated signal of which each predetermined fractional cycle has an amplitude and a duration that are inversely proportional to each other and related to the sampled amplitude of the input signal. The modulated signal is demodulated by either or both of the techniques of zero-crossing detection and peak-amplitude detection. The system is self-clocking, without discontinuous phase or amplitude changes and without DC components being introduced. The system transmits its own signal-recovering clock information and thereby permits modulation at a rate in excess of the carrier signal frequency.

20 Claims, 41 Drawing Figures

FRACTIONAL-CYCLE TIME/AMPLITUDE MODULATION

BACKGROUND OF THE INVENTION

The present invention generally pertains to communication signal modulation and is particularly directed to a novel system that is capable of modulating either analog or digital information onto a carrier signal for transmission over a bandwidth-limited transmission medium.

The more prevalent prior art techniques for modulating carrier signals are frequency modulation (FM), phase modulation (PM) and amplitude modulation (AM).

In conventional FM, information is impressed upon a carrier signal by deviating the frequency of the carrier signal by an amount proportional to the instantaneous amplitude of the modulating signal. Normally, this is done over complete cycles of the deviated carrier signal since, with the most common detection techniques, there is no information in a partial cycle. While FM has no abrupt amplitude changes, it can have abrupt phase changes, and the frequency of the modulating analog information signal must be kept well below the frequency of the carrier signal. In addition, FM requires an externally synchronized clock to recover the signal, since the phase of the deviated carrier carries no information itself. Furthermore, while FM systems do not usually contemplate partial cycle modulation (the usual requirement being a full cycle to define the frequency), if each partial cycle of a FM signal is varied in duration to represent the information, the result can contain a DC component that is not acceptable to most transmission or recording media.

In conventional PM, information is impressed upon a carrier signal by deviating the phase of the carrier signal from the original angle (with no modulating signal) by an amount proportional to the instantaneous amplitude of the modulating signal. PM is generally subject to the same restrictions as FM.

In conventional AM, information is impressed upon a carrier signal by deviated the amplitude of the carrier signal by an amount proportional to the instantaneous amplitude of the modulating signal. Again, the frequency of the modulating analog information signal must be lower than that of the carrier signal to avoid unwanted DC components. Also, AM is subject to error if the transmission or storage medium suffers from amplitude variations. Furthermore, if the amplitude of each half-cycle of a true AM signal is independently varied, the result can contain a DC component that is not acceptable to most transmission or recording media.

SUMMARY OF THE INVENTION

The present invention provides a new type of modulation system for modulating a carrier signal by an input signal having a variable amplitude. In accordance with the system of the present invention, the amplitude of the input signal is sampled every predetermined fractional cycle of the modulated signal; and the carrier signal is modulated in response to the sampled amplitude of the input signal to provide a modulated signal of which each predetermined fractional cycle has an amplitude and a duration that are inversely proportional to each other and related to the sampled amplitude of the input signal. As is well known, the area under a sinusoidal half-cycle whose peak value is E and whose duration is T, is proportional to ET. By making T proportional to the amplitude of the sampled input signal and E inversely proportional to such amplitude, or vice versa, the area under each half-cycle is the same regardless of the amplitude of the input signal, and the average amplitude of the transmitted signal containing half-cycles of alternating polarity is zero. As a result, the system of the present invention is insensitive to amplitude variations common to many transmission and storage media and also avoids DC sideband components.

The modulated signal can be demodulated readily at a receiver by either or both of the two relatively simple techniques of zero-crossing detection and peak-amplitude detection.

In either case, the system of the present invention is self-clocking in that the modulated signal can be demodulated either on peaks (half-way between zero crossings) or on zero-crossings themselves, all without discontinuous phase or amplitude changes, and without DC components being introduced.

The system also, unlike FM, transmits its own signal-recovering clock information and thereby permits modulation at a rate in excess of the carrier signal frequency.

The system of the present invention also, unlike AM, transmits an equal area of carrier signal for every value of signal to be transmitted, thus making the signal-to-noise rates independent of the signal value.

Reference is made first to those embodiments wherein each predetermined fractional cycle of the carrier signal is modulated to have an amplitude that is proportional to the sampled amplitude of the input signal and a duration that is inversely proportional to the sampled amplitude of the input signal. In these embodiments the modulated signal may be demodulated either (a) by detecting the amplitude peaks of the modulated signal and by providing a demodulated signal having an amplitude that is proportional to the detected peak amplitudes; or (b) by detecting zero-crossings of the modulated signal and by providing a demodulated signal having an amplitude that is inversely proportional to the duration between the detected zero-crossings.

In other embodiments, each predetermined fractional cycle of the carrier signal is modulated to have an amplitude that is inversely proportional to the sampled amplitude of the input signal and a duration that is proportional to the sampled amplitude of the input signal. In these embodiments, the modulated signal may be demodulated either (a) by detecting the amplitude peaks of the modulated signal and by providing a demodulated signal having an amplitude that is inversely proportional to the detected peak amplitudes; or (b) by detecting zero-crossings of the modulated signal and by providing a demodulated signal having an amplitude that is proportional to the duration between the detected zero-crossings.

The system of the present invention provides several additional important features, which are discussed below with reference to the detailed description of the preferred embodiments.

DESCRIPTION OF THE PREFERRED EMBODIMENTS

Figure 1:
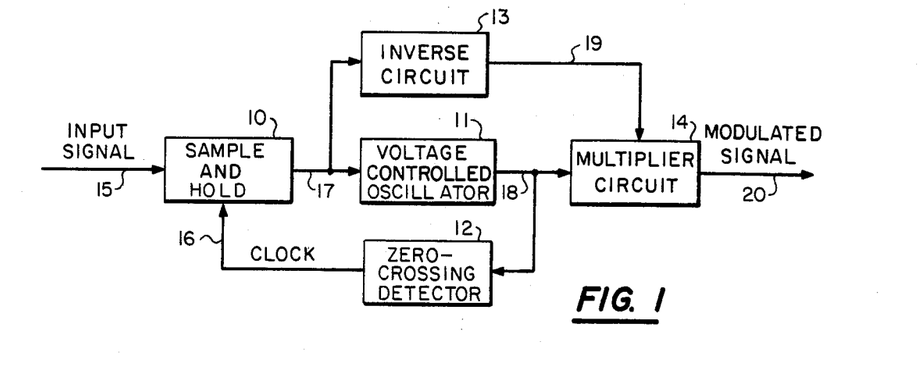
FIG. 1 is a block diagram of one preferred embodiment of the modulation system of the present invention.
Figure 4A:
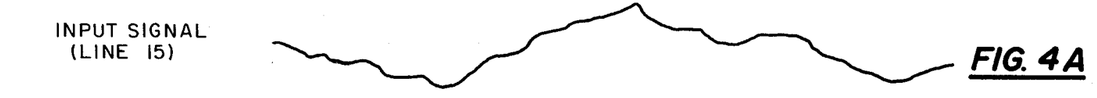
FIGS. 4A through 4D are waveforms illustrating the relative timing of signals present in the system of FIG. 1.

Referring to FIG. 1, one preferred embodiment of a modulation system according to the present invention includes a sample-and-hold circuit 10, a voltage controlled oscillator (VCO) 11, a zero-crossing detector 12, an inverse circuit 13 and a multiplier circuit 14. An input signal is provided on line 15 to the sample-and-hold circuit 10. An exemplary waveform of an input signal on line 15 is illustrated in FIG. 4A. In this example the input signal is an analog signal.

The sample-and-hold circuit 10 samples the input signal on line 15 in response to a series of clock signals on line 16 and provides a sample signal on line 17 that is held at the sampled amplitude of the input signal on line 15 until reset in response to the next clock signal on line 16.

The VCO 11 receives the sample signal on line 17 and responds thereto by providing a uniform-peak-amplitude oscillating signal on line 18 having a half-cycle duration that is proportional to the amplitude of the sample signal on line 17.

Figure 4B:
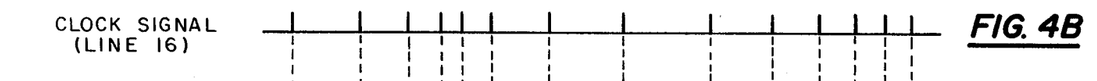
Figure 4C:
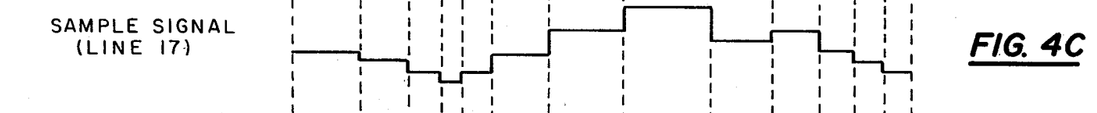

The zero-crossing detector 12 is coupled to the output of the VCO 11 and responds to the oscillating signal on line 18 by providing a clock signal pulse on line 16 upon each zero-crossing of the oscillating signal on line 18. The waveform of the clock signal on line 16 is illustrated in FIG. 4B; and the waveform of the sample signal provided on line 17 in response to a series of clock signal pulses on line 16 is illustrated in FIG. 4C.

The inverse circuit 13 also receives the sample signal on line 17 and responds thereto by providing an inverse signal on line 19 having an amplitude that is inversely porportional to the amplitude of the sample signal on line 17.

Figure 4D:
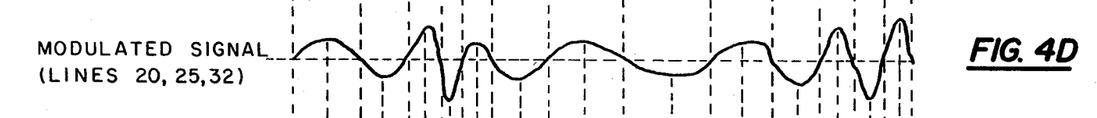

The multiplier circuit 14 multiplies the inverse signal on line 19 by the oscillating signal on line 18 to provide a modulated signal on line 20. The waveform of the modulated signal on line 20 is illustrated in FIG. 4D. It is important to note that in the modulated signal on line 20, the area under each sinusoidal half-cycle is a constant equal to the product of the peak amplitude of the half-cycle and the duration of the half-cycle.

Figure 2:
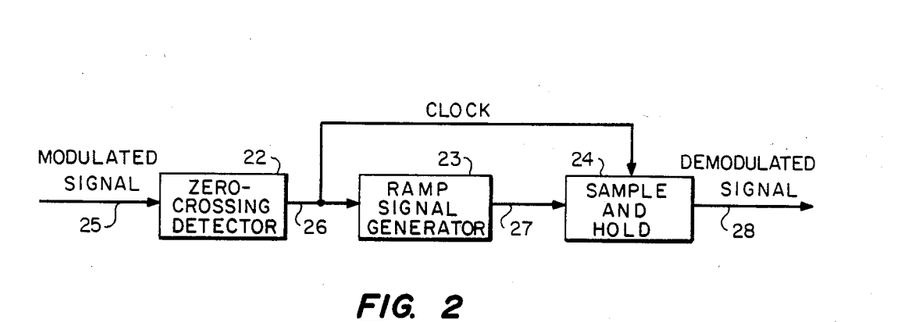
FIG. 2 is a block diagram of one system for demodulating signals modulated by the system of FIG. 1.
Figure 3:
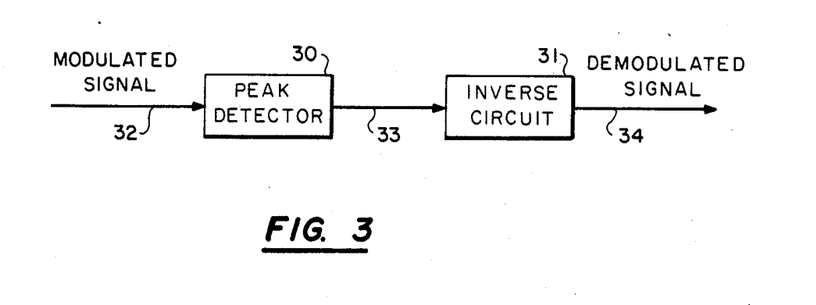
FIG. 3 is a block diagram of a second system for demodulating signals modulated by the system of FIG. 1.

The modulated signal on line 20 in the modulation system of FIG. 1 can be demodulated by either the demodulation system of FIG. 2 or the demodulation system of FIG. 3.

Typically the modulation system is a part of a transmitter system and the demodulation system is a part of a receiver system.

The demodulation system of FIG. 2 includes a zero-crossing detector 22, a ramp-signal generator 23 and a sample-and-hold circuit 24. A received modulation signal substantially identical to the modulation signal on line 20 of the modulation system of FIG. 1 is provided on line 25 to the zero-crossing detector 22.

Figure 4E:
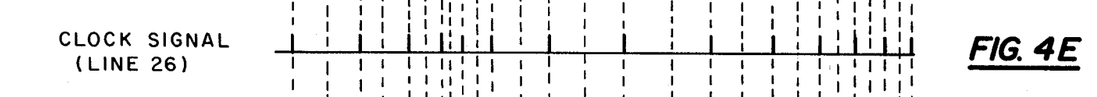
FIGS. 4E and 4F are waveforms illustrating the timing of signals present in the system of FIG. 2 in relation to the timing of the signals present in the system of FIG. 1.

The zero-crossing detector 22 detects each zero-crossing of the modulated signal on line 25 and provides a clock signal pulse on line 26 in response to each detected zero-crossing. The waveform of the clock signal on line 26 is illustrated in FIG. 4E.

The ramp-signal generator 23 receives the clock signal on line 26 and responds thereto by generating a ramp signal on line 27 that increases in amplitude from zero between successive clock signal pulses on line 26. The ramp signal on line 27 is provided to the sample-and-hold circuit 24.

Figure 4F:
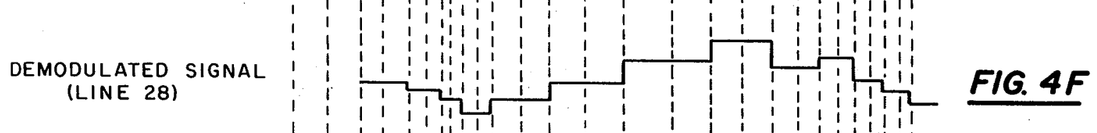

The sample-and-hold circuit 24 samples the amplitude of the ramp signal on line 27 in response to each clock signal pulse on line 26 and provides a demodulated signal on line 28 that is held at the sampled amplitude of the ramp signal until reset in response to the next clock signal pulse on line 26. The waveform of the demodulated signal on line 28 is illustrated in FIG. 4F. In comparing the demodulated signal of FIG. 4F to the input signal of FIG. 4A it is seen that the demodulated signal tracks the amplitude variations of the input signal.

The demodulation system of FIG. 3 includes a peak detector 30 and an inverse circuit 31. A received modulation signal substantially identical to the modulation signal on line 20 of the modulation system of FIG. 1 is provided on line 32 to the peak detector 30.

The peak detector 30 detects each amplitude peak of the modulated signal on line 32 and provides a detected signal on line 33 having an amplitude that is held at a value which is proportional to the peak amplitude of the modulated signal on line 32 until the next amplitude peak is detected.

Figure 4G:
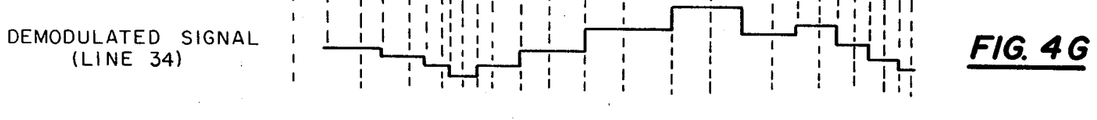
FIG. 4G is a waveform illustrating the timing of the demodulated signal provided in the system of FIG. 3 in relation to the timing of the signals present in the system of FIG. 1.

The inverse circuit 31 receives the detected signal on line 33 and responds thereto by providing a demodulated signal on line 34 having an amplitude that is inversely proportional to the amplitude of the detected signal. The waveform of the demodulated signal on line 34 is illustrated in FIG. 4G. It is seen that the demodulated signal shown in FIG. 4G tracks the amplitude variations of the input signal shown in FIG. 4A.

Figure 5:
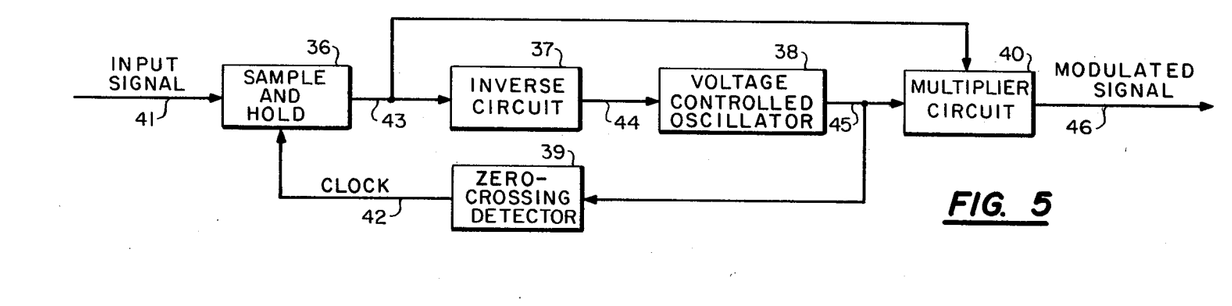
FIG. 5 is a block diagram of an alternative preferred embodiment of the modulation system of the present invention.
Figure 8A:
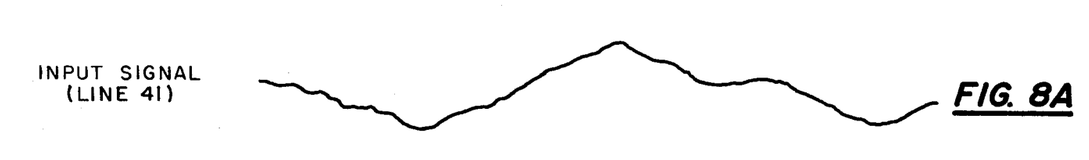
FIGS. 8A through 8D are waveforms illustrating the relative timing of signals present in the system of FIG. 5.

Referring to FIG. 5, an alternative embodiment of a modulation system according to the present invention includes a sample-and-hold circuit 36, an inverse circuit 37, a VCO 38, a zero-crossing detector 39 and a multiplier circuit 40. An input signal is provided on line 41 to the sample-and-hold circuit 36. An exemplary waveform of an input signal on line 41 is illustrated in FIG. 8A. In this example the input signal is an analog signal.

The sample-and-hold circuit 36 samples the input signal on line 41 in response to a series of clock signals on line 42 and provides a sample signal on line 43 that is held at the sampled amplitude of the input signal on line 41 until reset in response to the next clock signal on line 42.

The inverse circuit 37 receives the sample signal on line 43 and responds thereto by providing an inverse signal on line 44 having an amplitude that is inversely proportional to the amplitude of the sample signal on line 43.

The VCO 38 receives the inverse signal on line 44 and responds thereto by providing a uniform-peak-amplitude oscillating signal on line 45 having a half-cycle duration that is proportional to the amplitude of the inverse signal on line 44.

Figure 8B:
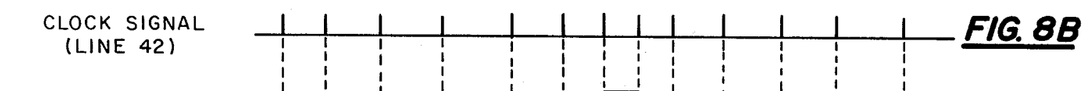
Figure 8C:
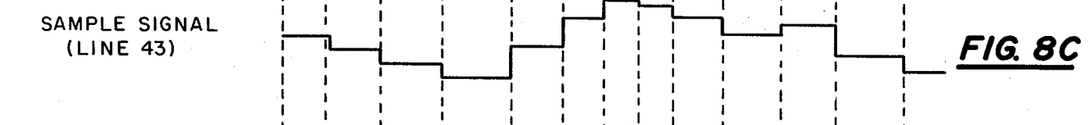

The zero-crossing detector 39 is coupled to the output of the VCO 38 and responds to the oscillating signal on line 45 by providing a clock signal pulse on line 42 upon each zero-crossing of the oscillating signal on line 45. The waveform of the clock signal on line 42 is illustrated in FIG. 8B; and the waveform of the sample signal provided on line 43 in response to a series of clock signal pulses on line 42 is illustrated in FIG. 8C.

Figure 8D:
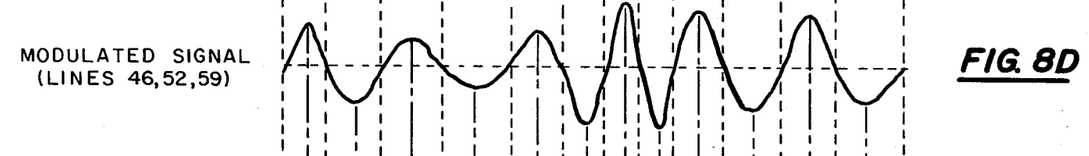

The multiplier circuit 40 multiplies the sample signal on line 43 by the oscillating signal in line 45 to provide a modulated signal on line 46. The waveform of the modulated signal on line 46 is illustrated in FIG. 8D. It is important to note that in the modulated signal on line 46, the area under each sinusoidal half-cycle is a constant equal to the product of the peak amplitude of the half-cycle and the duration of the half-cycle.

Figure 6:
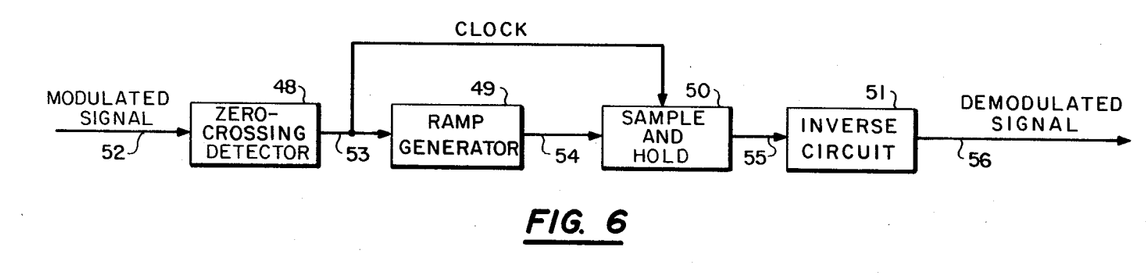
FIG. 6 is a block diagram of one system for demodulating signals modulated by the system of FIG. 5.
Figure 7:
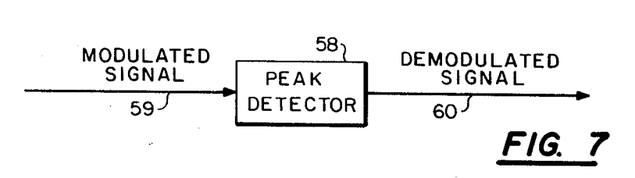
FIG. 7 is a block diagram of a second system for demodulating signals modulated by the system of FIG. 5.

The modulated signal on line 46 in the modulation system of FIG. 5 can be demodulated by either the demodulation system of FIG. 6 or the demodulation system of FIG. 7.

The demodulation system of FIG. 6 includes a zero-crossing detector 48, a ramp-signal generator 49, a sample-and-hold circuit 50 and an inverse circuit 51. A received modulation signal substantially identical to the modulation signal on line 46 of the modulation system of FIG. 5 is provided on line 52 to the zero-crossing detector 48.

Figure 8E:
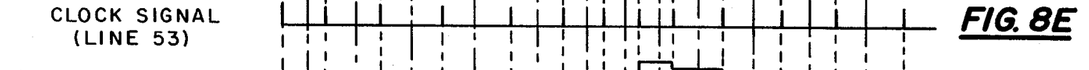
FIGS. 8E and 8F are waveforms illustrating the timing of signals present in the system of FIG. 6 in relation to the timing of the signals present in the system of FIG. 5.

The zero-crossing detector 48 detects each zero-crossing of the modulated signal on line 52 and provides a clock signal pulse on line 53 in response to each detected zero-crossing. The waveform of the clock signal on line 53 is illustrated in FIG. 8E.

The ramp-signal generator 49 receives the clock signal on line 53 and responds thereto by generating a ramp signal on line 54 that increases in amplitude from zero between successive clock signal pulses on line 53. The ramp signal on line 54 is provided to the sample-and-hold circuit 50.

The sample-and-hold circuit 50 samples the amplitude of the ramp signal on line 54 in response to each clock signal pulse on line 53 and provides a sample signal on line 55 that is held at the sampled amplitude of the ramp signal until reset in response to the next clock signal pulse on line 53.

Figure 8F:
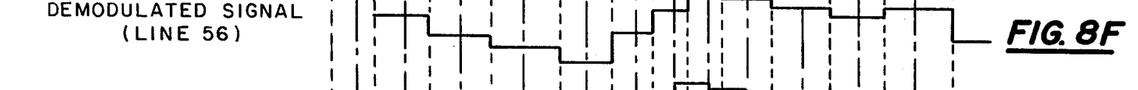

The inverse circuit 51 receives the sample signal on line 55 and responds thereto by providing a demodulated signal on line 56 having an amplitude that is inversely proportional to the amplitude of the sample signal. The waveform of the demodulated signal on line 56 is illustrated in FIG. 8F. It is seen that the demodulated signal shown in FIG. 8F tracks the amplitude variations of the input signal shown in FIG. 8A.

The demodulation system of FIG. 7 includes a peak detector 58. A received modulation signal substantially identical to the modulation signal on line 46 of the modulation system of FIG. 5 is provided on line 59 to the peak detector 58.

Figure 8G:
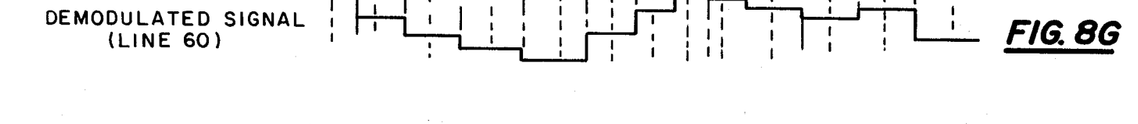
FIG. 8G is a waveform illustrating the timing of the demodulated signal provided in the system of FIG. 7 in relation to the timing of the signals present in the system of FIG. 5.

The peak detector 58 detects each amplitude peak of the modulated signal on line 59 and provides a demodulated signal on line 60 having an amplitude that is held at a value which is proportional to the peak amplitude of the modulated signal on line 59 until the next amplitude peak is detected. The waveform of the demodulated signal on line 60 is illustrated in FIG. 8G. In comparing the demodulated signal shown in FIG. 8G to the input signal shown in FIG. 8A it is seen that the demodulated signal tracks the amplitude variations of the input signal.

Note that the modulation systems of FIG. 1 and FIG. 5 provide means for choosing parameters to optimize performance corresponding to known or suspected properties of the signal. For example, the system of FIG. 1 in effect samples the input signal more frequently in regions of low signal amplitude. Since more frequent sampling results in more accurate reproduction at the receiver, this might be important, for example, when it is known that low amplitude signals are more subject to interference by noise. Conversely, the system of FIG. 5 in effect samples the input signal more frequently in regions of high signal amplitude. This might be important, for example, when the signal has a non-linear characteristic at high amplitudes.

Also, the waveform examples of FIGS. 4A through 4G and 8A through 8G for the systems of FIGS. 1–3 and 5–7, respectively, illustrate the modulation and demodulation of analog input signals; the above-described systems also are useful for modulating and demodulating N-ary data signals. In the binary case, the sinusoidal half-cycles would possess only two different values of duration and amplitude; in trinary, three values; in quaternary, four values, etc. In the binary case, for example, the sequence of half-cycles would represent a sequence of 0's and 1's with, for example a 0 represented by a high-amplitude, short-duration half-cycle and a 1 by a low-amplitude, long-duration half cycle.

Figure 9:
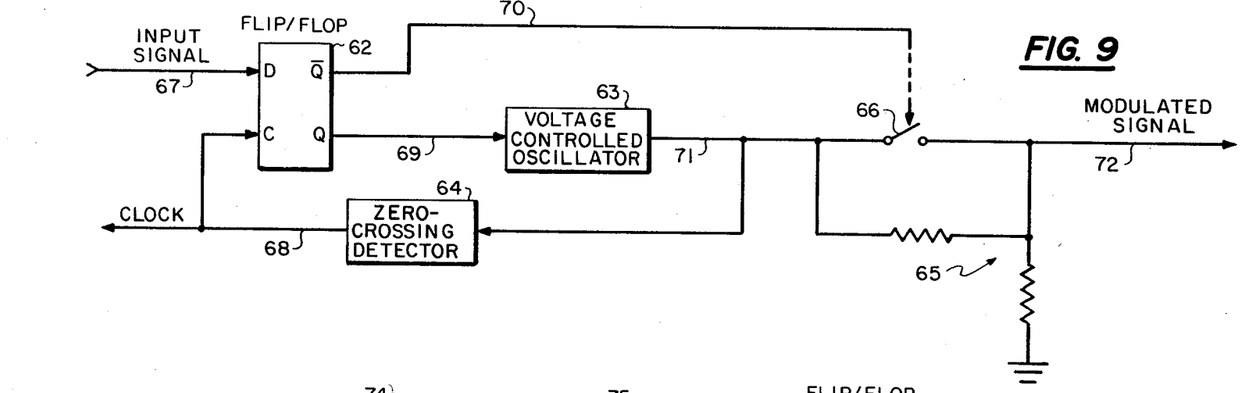
FIG. 9 is a block diagram of a preferred embodiment of the modulation system of the present invention particularly adapted for modulating binary information onto the carrier signal.
Figure 12A:
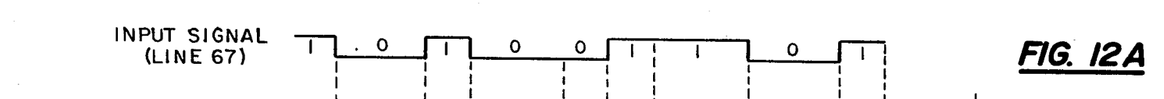
FIGS. 12A through 12D are waveforms illustrating the relative timing of signals present in the system of FIG. 9.

Another embodiment of a modulation system according to the present invention that is particularly adapted for modulating binary data input signals is shown in FIG. 9. The modulation system of FIG. 9 includes a D-flip-flop 62, a VCO 63, a zero-crossing detector 64, an attenuation circuit 65 and a switch 66. A binary data input signal is provided on line 67 to the data input D of the flip-flop 62. An exemplary waveform of the binary data input signal on line 67 is illustrated in FIG. 12A.

Figure 12B:
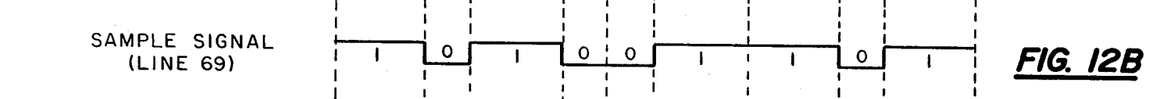

The flip-flop 62 stores the state of the binary signal on line 67 in response to each of a series of clock signal pulses provided on line 68 to the clock input C of the flip-flop 62, and responds to the next clock signal pulse on line 68 by providing a sample signal from its Q output onto line 69 having an amplitude representative of the previously stored state of the binary signal. The waveform of the sample signal on line 69 is illustrated in FIG. 12B. The logical complement of the sample signal on line 69 is provided on line 70 from the $\overline{Q}$ output of the flip-flop 62.

The VCO 63 receives the sample signal on line 69 and responds thereto by providing a uniform-peak-amplitude oscillating signal on line 71 having a half-cycle duration that is proportional to the amplitude of the sample signal on line 69. For example when the sample signal amplitude which is representative of binary 1-state is greater than the amplitude which is representative of binary 0-state, the half-cycle duration of the oscillating signal on line 71 which is representative of the 1-state will be greater than the half-cycle duration which is representative of a 0-state. Accordingly, the duration of each half-cycle of the oscillating signal on line 71 is either one or the other of two different predetermined durations.

Figure 12C:
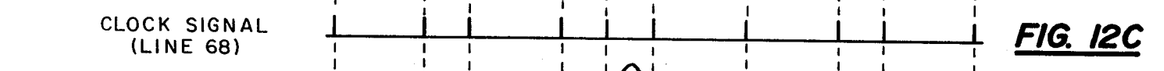

The zero-crossing detector 64 is coupled to the output of the VCO 63 and responds to the oscillating signal on line 71 by providing a clock signal pulse on line 68 upon each zero-crossing of the oscillating signal on line 71. The waveform of the clock signal on line 68 is illustrated in FIG. 12C. The clock signal on line 68 also clocks the timing of the binary input signal that is provided on line 67 to the flip-flop 62. The means for effecting such timing are not shown.

The attenuation circuit 65 attenuates the amplitude of the oscillating signal on line 71 when the switch 66 is open. The switch 66 is controlled by the complementary logic signal on line 70 to be closed only during the longer-duraction half-cycles of the oscillating signal on line 71. The attenuation circuit 65 attenuates the amplitude of the oscillating signal on line 71 during the longer-duration half-cycles to provide a modulated signal on line 72 for which the product of the peak amplitude and the half-cycle duration is a constant notwithstanding the value of the binary data signal on line 67.

Figure 12D:
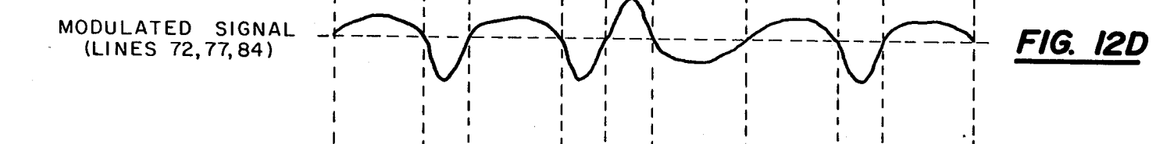

The waveform of the modulated signal on line 72 is illustrated in FIG. 12D. The above-described system of FIG. 9 can work equally well with either the binary-0 state represented by short duration, large amplitude half-cycles and the binary-1 state represented by long duration small amplitude half-cycles, or by the logical complement.

Figure 10:
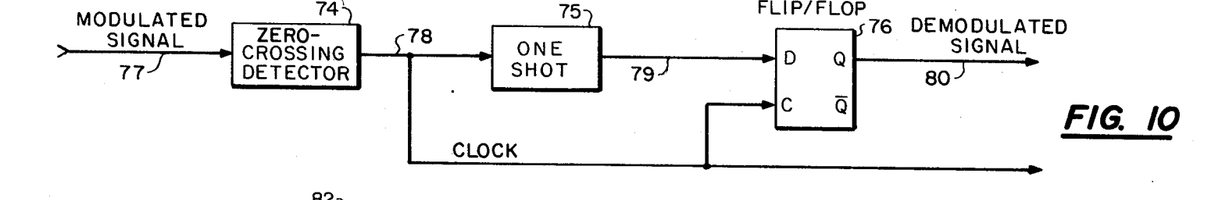
FIG. 10 is a block diagram of one system for demodulating signals modulated by the system of FIG. 9.
Figure 11:
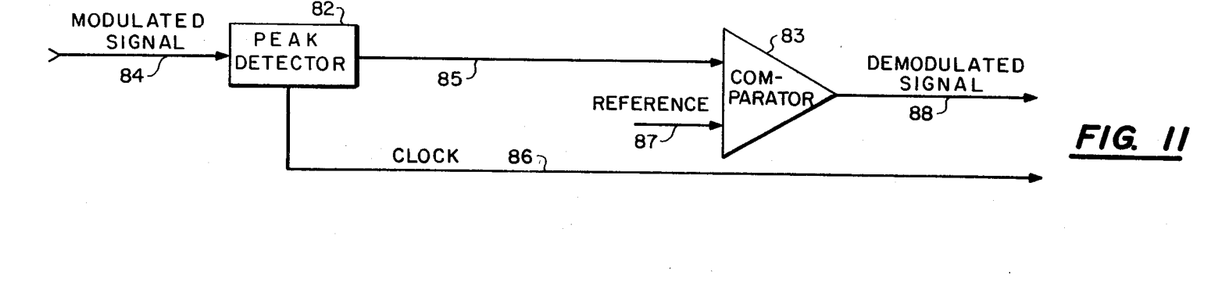
FIG. 11 is a block diagram of a second system for demodulating signals modulated by the system of FIG. 9.

The modulated signal on line 72 in the modulation system of FIG. 9 can be demodulated by either the demodulation system of FIG. 10 or the demodulation system of FIG. 11.

The demodulation system of FIG. 10 includes a zero-crossing detector 74, a retriggerable one-shot multivibrator 75 and a D-flip-flop 76. A received modulation signal substantially identical to the modulation signal on line 72 of the modulation system of FIG. 9 is provided on line 77 to the zero-crossing detector 74.

Figure 12E:
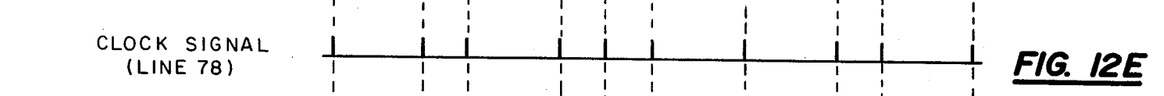
FIGS. 12E and 12F are waveforms illustrating the timing of signals present in the system of FIG. 10 in relation to the timing of the signals present in the system of FIG. 9.

The zero-crossing detector 74 detects each zero-crossing of the modulated signal on line 77 and provides a clock signal pulse on line 78 in response to each detected zero-crossing. The waveform of the clock signal on line 78 is illustrated in FIG. 12E.

The one-shot multivibrator circuit 75 responds to the clock signal pulses on line 78 by generating a pulse train on line 79 in which the pulses each have a duration that is approximately the average of the two predetermined half-cycle durations. The pulse train on line 79 is provided to the D input of the flip-flop 76.

Figure 12F:
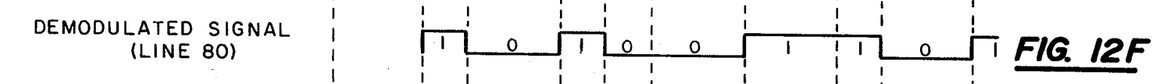

The flip-flop 76 samples the amplitude of its generated pulse train on line 79 in response to the clock signal pulses on line 78 and provides a demodulated signal on line 80 having a binary state determined by whether or not the previously generated pulse in the pulse train on line 79 had expired prior to the onset of the present clock signal on line 78. The waveform of the demodulated binary signal on line 80 is illustrated in FIG. 12F. It is seen that the demodulated binary data signal on line 80, as shown in FIG. 12F, tracks the input binary data signal on line 67 in the system of FIG. 9, as shown in FIG. 12A. Further processing of the demodulated binary data signal on line 80 is clocked by the clock signal on line 78.

The demodulation system of FIG. 11 includes a peak detector 82 and a comparator 83. A received modulation signal substantially identical to the modulation signal on line 72 of the modulation system of FIG. 9 is provided on line 84 to the peak detector 82.

Figures 12G, 12H:
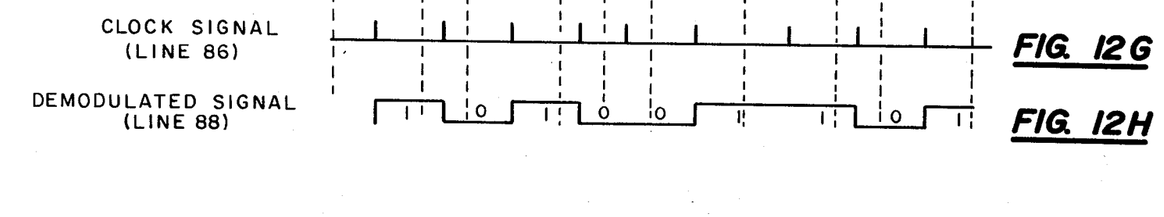
FIGS. 12G and 12H are waveforms illustrating the timing of signals present in the system of FIG. 11 in relation to the timing of the signals present in the system of FIG. 9.

The peak detector 82 detects each amplitude peak of the modulated signal on line 84 and provides a detected signal on line 85 having an amplitude that is held at a value which is proportional to the peak amplitude of the modulated signal on line 84 until the next amplitude peak is detected. The peak detector also provides a clock signal pulse on line 86 upon detecting each amplitude peak in the modulated signal on line 84. The waveform of the clock signal on line 86 is illustrated in FIG. 12G.

The detected signal on line 85 is provided to one input of the comparator 83. A reference signal is provided on line 87 to the other input of the comparator 83. The reference signal has a predetermined threshold value which is set at the average of the two different predetermined amplitudes of the two different-duration half-cycles of the modulated signal on line 84.

The comparator compares the amplitude of the detected signal on line 85 to the predetermined threshold value of the reference signal on line 87 and provides a demodulated binary state determined by whether the amplitude of the detected signal is more or less than the predetermined threshold value. The waveform of the demodulated binary signal on line 88 is illustrated in FIG. 12H. In the example shown, a binary-1 state is indicated when the detected peak amplitude is less than the predetermined threshold value, and a binary-0 state is indicated when the detected peak amplitude is greater than the predetermined threshold value. It is seen that the demodulated binary signal on line 88, as shown in FIG. 12H tracks the input binary data signal on line 67 in the system of FIG. 9, as shown in FIG. 12A. Further processing of the demodulated binary signal on line 88 is clocked by the clock signal on line 86.

An embodiment of the modulation system of the present invention that is particularly adapted for modulating the carrier signal every quarter cycle is described with reference to FIG. 13. The modulation system of FIG. 13 includes a first sample-and-hold circuit 90, a second sample-and-hold circuit 91, a switch 92, a VCO 93, a peak detector 94, a zero-crossing detector 95, a Q-flip-flop 96, an averaging circuit 97, a third sample-and-hold circuit 98, a delay circuit 99, an inverse circuit 100 and a multiplier circuit 101.

Figures 15A, 15B:
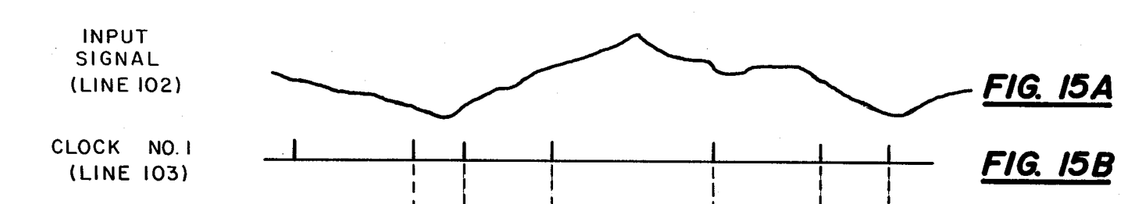
FIGS. 15A through 15F are waveforms illustrating the relative timing of signals present in the system of FIG. 13.

An input signal is provided on line 102 to both the first sample-and-hold circuit 90 and the second sample-and-hold circuit 91. An exemplary waveform of an input signal on line 102 is illustrated in FIG. 15A. In this example, the input signal is an analog signal.

The first sample-and-hold circuit 90 samples the amplitude of the input signal on line 102 in response to a series of first clock signals on line 103 and provides a first sample signal on line 104 that is held at the sampled amplitude of the input signal on line 102 until reset in response to the next first clock signal on line 103. The second sample-and-hold circuit 91 samples the amplitude of the input signal on line 102 in response to a series of second clock signals on line 105 and provides a second sample signal on line 106 that is held at the sampled amplitude of the input signal on line 102 until reset in response to the next second clock signal on line 105.

The switch 92 alternately provides either the first sample signal on line 104 or the second sample signal on line 106 onto line 107 and thence to the input of the VCO 93. Control of the switch 92 is described below with reference to the flip-flop 96.

The VCO 93 alternately responds to either the first sample signal on line 104 or the second sample signal on line 106 in accordance with the position of the switch 92 by providing a uniform-peak-amplitude oscillating signal on line 108 having a quarter-cycle duration that is proportional to the amplitude of the respective first or second sample signal on line 104 or line 106.

The peak detector 94 is coupled to the output of the VCO 93 and responds to the oscillating signal on line 108 by providing a first clock signal pulse on line 103 upon each amplitude peak of the oscillating signal on line 108. The waveform of the first clock signal on line 103 is illustrated in FIG. 15B.

Figures 15C, 15D:
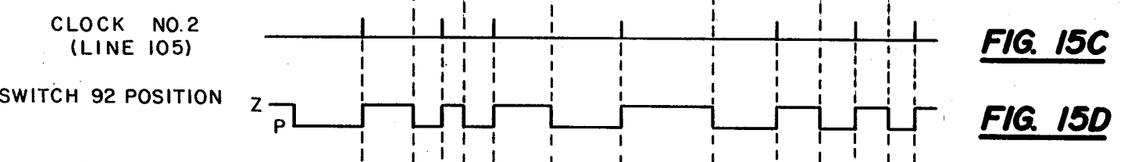

The zero-crossing detector 95 is coupled to the output of the VCO 93 and responds to the oscillating signal on line 108 by providing a second clock signal pulse on line 105 upon each zero-crossing of the oscillating signal on line 108. The waveform of the second clock signal on line 105 is illustrated in FIG. 15C.

The Q-flip-flop 96 receives the first clock signal, which is indicative of amplitude-peaks, at its R input and receives the second clock signal, which is indicative of zero-crossings, at its S input. Thus the state of the Q output of the flip-flop 96 is changed upon each amplitude peak and upon each zero-crossing of the oscillating signal on line 108. A two-state control signal is provided on line 109 from the Q output of the flip-flop 96 to control the operation of the switch 92. The switch 92 responds to the respective states of the control signal on line 109 by moving to position Z when each zero-crossing is detected and by moving to position P when each amplitude-peak is detected. The waveform showing the positions of the switch 92 in relation to the timing of the first clock signal on line 103 and the second clock signal on line 105 is illustrated in FIG. 15D.

Figure 15E:
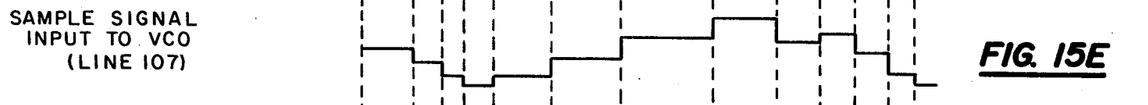

Accordingly it is seen that the combination of the switch 92, the peak detector 94, the zero-crossing detector 95 and the flip-flop 96 cause the VCO 93 to be responsive to the first sample signal on line 104 from when a zero-crossing of the oscillating signal on line 108 is indicated by a second clock signal pulse on line 105 until the next peak-amplitude of the oscillating signal on line 108 is indicated by the next first clock signal pulse on line 103, and to be responsive to the second sample signal on line 106 from when a peak-amplitude of the oscillating signal on line 108 is indicated by a first clock signal pulse on line 103 until the next zero-crossing of the oscillating signal on line 108 is indicated by the next second clock signal pulse on line 105. The waveform of the sample signal provided on line 107 to the input of the VCO 93 is illustrated in FIG. 15E.

The averaging circuit 97 averages the first and second sample signals on lines 104 and 106 to provide an averaged signal on line 110.

The third sample-and-hold circuit 98 samples the amplitude of the averaged signal on line 110 in response to a series of the delayed clock signal, pulses on line 111 and provides a third sample signal on line 112 that is held at the sampled amplitude of the averaged signal on line 110 until reset in response to the next delayed clock signal on line 111.

The delay circuit 99 provides the delayed clock signal on line 111 by delaying the second clock signal on line 105 so that the delayed clock signal on line 111 does not coincide with a transition of the switch 92. Alternatively, the delayed clock signal on line 111 could be provided by delaying the first clock signal on line 103.

The inverse circuit 100 receives the third sample signal on line 112 and responds thereto by providing an inverse signal on line 113 having an amplitude that is inversely proportional to the amplitude of the third sample signal on line 112.

Figure 15F:
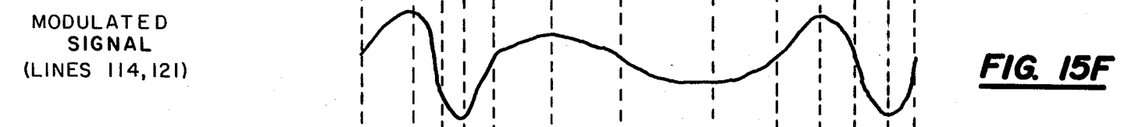

The multiplier circuit 101 multiplies the oscillating signal on line 108 by the inverse signal on line 113 to provide a modulated signal on line 114 that is modulated every quarter cycle. The waveform of the modulated signal on line 114 is illustrated in FIG. 15F. The modulated signal on line 114 is a sequence of alternating polarity sinusoidal half-cycles. Each half-cycle has a duration that is proportional to approximately the average value of the respective amplitudes of the first and second sample signals on lines 104 and 106 and has an amplitude that is inversely proportional to such average value. Accordingly the area under each sinusoidal half-cycle remains constant notwithstanding the amplitude of the input signal on line 102.

Figure 13:
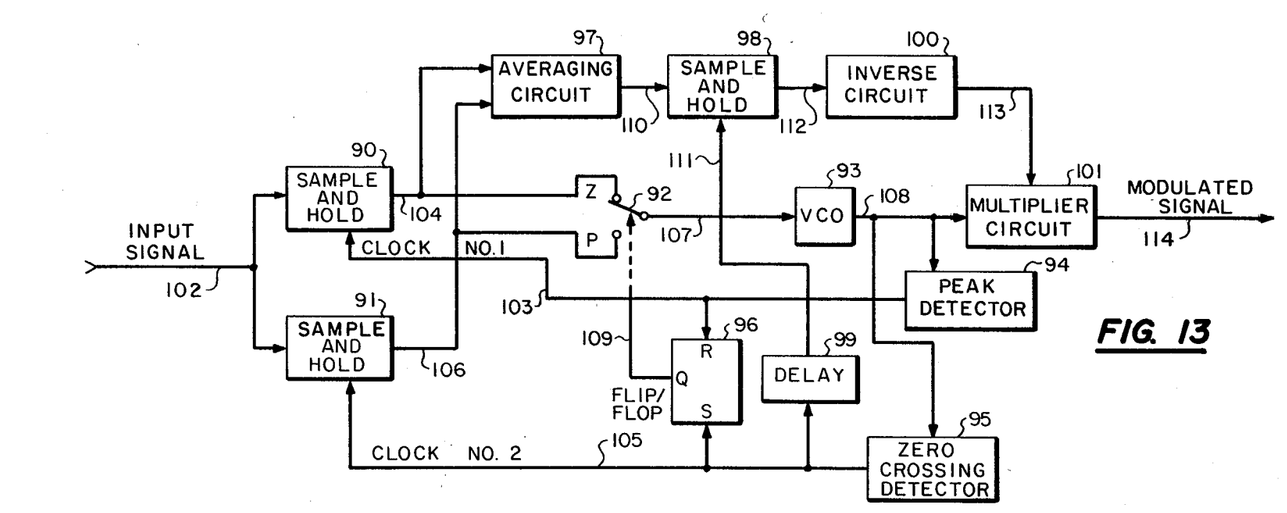
FIG. 13 is a block diagram of a preferred embodiment of the modulation system of the present invention particularly adapted for modulating the carrier signal every quarter-cycle.
Figure 14:
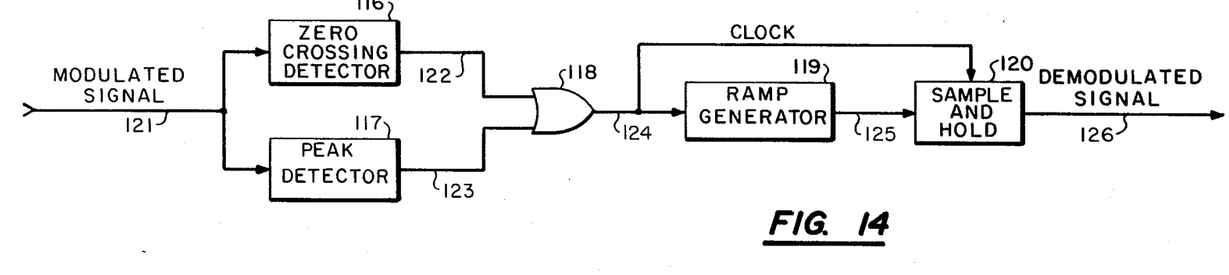
FIG. 14 is a block diagram of a system for demodulating signals modulated by the system of FIG. 13.

The modulated signal on line 114 in the modulation system of FIG. 13 can be demodulated by the demodulation system of FIG. 14. The demodulation system of FIG. 14 includes a zero-crossing detector 116, a peak detector 117, an OR gate 118, a ramp generator 119 and a sample-and-hold circuit 120.

A received modulation signal substantially identical to the modulation signal on line 114 of the modulation system of FIG. 13 is provided on line 121 to both the zero-crossing detector 116 and the peak detector 117.

The zero-crossing detector 116 detects each zero-crossing of the modulated signal on line 121 and provides a first detected signal pulse on line 122 to one input of the OR gate 118 in response to each detected zero-crossing.

The peak detector 117 detects each amplitude-peak of the modulated signal on line 121 and provides a second detected signal pulse on line 123 to a second input of the OR gate 118 in response to each detected amplitude-peak.

Figures 15G, 15H:
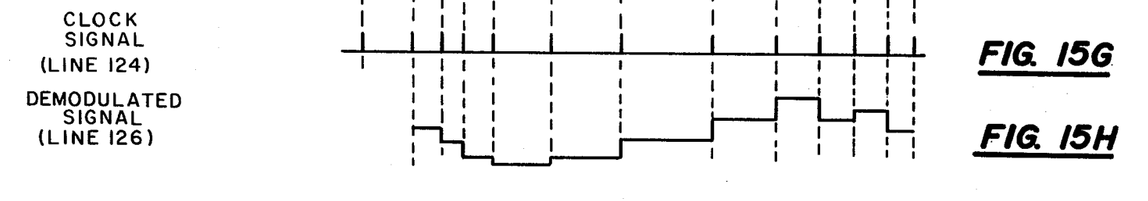
FIGS. 15G and 15H are waveforms illustrating the timing of signals present in the system of FIG. 14 in relation to the timing of the signals present in the system of FIG. 13.

The OR gate 118 combines the first and second detected signals on line 122 and 123 respectively to provide a clock signal on line 124. The waveform of the clock signal on line 124 is illustrated in FIG. 15G. It is seen that the clock signal on line 124 contains pulses corresponding to each detected zero-crossing of the modulated signal on line 121 and each detected amplitude peak of the modulated signal on line 121. The clock signal on line 124 is provided to the ramp signal generator 119 and to the sample-and-hold circuit 120.

The ramp signal generator responds to the clock signal pulses on line 124 by generating a ramp signal on line 125 that increases in amplitude from zero between successive pulses of the clock signals on line 124.

The sample-and-hold circuit 120 samples the amplitude of the ramp signal on line 125 in response to the clock signal pulses on line 124 and provides a demodulated signal on line 126 that is held at the sampled amplitude of the ramp signal on line 125 until reset in response to the next clock signal pulse on line 124. The waveform of the demodulated signal on line 126 is illustrated in FIG. 15H. It is seen that the demodulated signal shown in FIG. 15H tracks the amplitude variations of the input signal shown in FIG. 15A.

The modulation system of FIG. 13 can be modified to provide a modulated signal in which each sinusoidal half-cycle has a duration that is inversely proportional to approximately the average value of the respective amplitudes of the first and second sample signals on lines 104 and 106 and has an amplitude that is proportional to such average value. Such modification consists of removing the inverse circuit 100 which is in series with the output of the sample-and-hold circuit 98 and providing an inverse circuit in series with the line 107 to the input of the VCO 93. Such a modification corresponds generally to that between the systems of FIGS. 1 and 5 described above.

In accordance with such a modification to the modulation system of the FIG. 13, the demodulation system of FIG. 14 would be modified by inserting an inverse circuit in series with line 126 from the output of the sample-and-hold circuit 120, whereby the demodulated signal would be provided from the output of the inserted inverse circuit.

A certain amount of error correction and noise suppression can be provided in the demodulation system of the present invention by adding some analytical equipment, such as a microprocessor. For example, suppose that a system is designed in which half-cycle durations fall in the range from 0.20 to 0.30 m.s. Following detection of a zero-crossing, it is therefore known that the next zero-crossing must occur within 0.20 to 0.30 m.s. If it does, then there is no problem. If, however, due to noise or other effects, the next zero-crossing occurs outside this range (either sooner than 0.20 m.s. or later than 0.30 m.s.), then the modulation waveform must have been interferred with. In this case the system can wait for the following zero-crossing. If it occurs within the range of 0.40 m.s. to 0.60 m.s., then it can be assumed that the modulation waveform has been restored, and the faulty data can be restored as follows. In the case of analog data, the information can be restored by averaging, thus "smoothing" the data. For example, if the zero-crossing in question occurs at 0.50 m.s. it can be assumed it must have been produced by two half-cycles each of equal 0.25 m.s. duration. In the case of binary data, if the zero-crossing in question occurs at or near 0.40 m.s., it can be inferred that it was produced by two half-cycles of 0.20 m.s., and represents the sequence 11, for example. If it occurs near 0.60 m.s., it can be inferred that it was produced by two half-cycles of 0.30 m.s., and represents 00, for example. If it occurs near 0.50 m.s., of course, it cannot be inferred whether it came from an original 01 or 10. The same logical analysis can be extended over a number (not just two) of half-cycle periods to provide a modest amount of "smoothing" in the case of analog data or error-correction in the case of digital data.

In the presence of severe noise, valid zero-crossings may be undetectable for some time at the receiver entirely, with the consequence that the self-clocking synchronization between transmitter and receiver is lost momentarily. Recovery from this situation is made by inserting periodic framing pulses. At non-periodic intervals, say every 100 or 200 signal samples, the input to the VCO is removed from the respective sample-and-hold circuit (FIGS. 1 and 13) or inverse circuit (FIG. 5) and switched to an arbitrary value selected by the system designer. At the same time, the second input to the multiplier is removed from the inverse circuit (FIGS. 1 and 13) or from the sample-and-hold circuit (FIG. 5). For the duration of this "framing" period, therefore, the transmitter produces a series of half-cycles of uniform amplitude and duration whose values are independently selectable by the system designer. Preferably, the selection is made outside the normal range of the input data signal itself, so that the presence of the framing signal can be independently detected at the receiver from the signals produced in the demodulation system. At the receiver, either the out-of-range peak-amplitude or the out-of-range zero-crossing time durations are detected to indicate the presence of the framing period. As soon as the framing period ends, the system returns to its normal mode of self-clocking data input based upon zero-crossings within its normal range. For example, in a system with 100 data samples between framing periods, if the transmitter reaches its 100th sample while the receiver, due to noise or other artifacts, has only recorded 95 zero-crossings, both the transmitter and receiver stop upon occurrence of the framing signal. When the transmitter resumes normal data transmission and the receiver detects the removal of the framing signal, the transmitter is transmitting the 101st sample, and the receiver likewise knows that it is receiving the 101st sample, not the 96th sample.

I claim:

1. A modulation system wherein a carrier signal is modulated by an input signal having a variable amplitude, comprising means for sampling the amplitude of the input signal every predetermined fractional cycle of the modulated signal; and means for modulating the carrier signal in response to the sampled amplitude of the input signal to provide a modulated signal of which each said predetermined fractional cycle has an amplitude and a duration that are inversely proportional to each other and related to the sampled amplitude of the input signal.

2. A system according to claim 1,
wherein the modulating means modulates each predetermined fractional cycle of the carrier signal to have an amplitude that is proportional to the sampled amplitude of the input signal and a duration that is inversely proportional to the sampled amplitude of the input signal.

3. A system according to claim 2, further comprising means for demodulating the modulated signal by detecting the amplitude peaks of the modulated signal and by providing a demodulated signal having an amplitude that is proportional to said detected peak amplitudes.

4. A system according to claim 2, further comprising means for demodulating the modulated signal by detecting zero-crossings of the modulated signal and by providing a demodulated signal having an amplitude that is inversely proportional to the duration between said detected zero-crossings.

5. A system according to claim 1,
wherein the modulating means modulates each predetermined fractional cycle of the carrier signal to have an amplitude that is inversely proportional to the sampled amplitude of the input signal and a duration that is proportional to the sampled amplitude of the input signal.

6. A system according to claim 5, further comprising means for demodulating the modulated signal by detecting the amplitude peaks of the modulated signal and by providing a demodulated signal having an amplitude that is inversely proportional to said detected peak amplitudes.

7. A system according to claim 5, further comprising means for demodulating the modulated signal by detecting zero-crossings of the modulated signal and by providing a demodulated signal having an amplitude that is proportional to the duration between said detected zero-crossings.

8. A system according to claim 1,
wherein the sampling means comprises means for sampling the amplitude of the input signal in response to a series of clock signals and for providing a sample signal that is held at the sampled amplitude of the input signal until reset in response to the next clock signal; and
wherein the modulating means comprises
means responsive to the sample signal for providing a uniform-peak-amplitude oscillating signal having a half-cycle duration that is proportional to the amplitude of the sample signal;
means responsive to the oscillating signal for providing a said clock signal upon each zero-crossing of the oscillating signal;
means responsive to the sample signal for providing an inverse signal having an amplitude that is inversely proportional to the amplitude of the sample signal; and
means for multiplying the oscillating signal by the inverse signal to provide a modulated signal.

9. A system according to claim 8, further comprising means for detecting each zero-crossing of the modulated signal and for providing a second clock signal in response to each detected said zero-crossing;
means responsive to the second clock signals for generating a ramp signal that increases in amplitude from zero between successive said second clock signals; and
means for sampling the amplitude of the ramp signal in response to the second clock signals and for providing a demodulated signal that is held at the sampled amplitude of the ramp signal until reset in response to the next second clock signal.

10. A system according to claim 8, further comprising means for detecting each amplitude peak of the modulated signal and for providing a detected signal having an amplitude that is held at a value which is proportional to the peak amplitude of the modulated signal until the next said amplitude peak is detected; and
means responsive to the detected signal for providing a demodulated signal having an amplitude that is inversely proportional to the amplitude of the detected signal.

11. A system according to claim 1,
wherein the sampling means comprises means for sampling the amplitude of the input signal in response to a series of clock signals and for providing a sample signal that is held at the sampled amplitude of the input signal until reset in response to the next clock signal; and
wherein the modulating means comprises
means responsive to the sample signal for providing an inverse signal having an amplitude that is inversely proportioned to the amplitude of the sample signal;
means responsive to the inverse signal for providing a uniform-peak-amplitude oscillating signal having a half-cycle duration that is proportional to the amplitude of the inverse signal;
means responsive to the oscillating signal for providing a said clock signal upon each zero-crossing of the oscillating signal; and
means for multiplying the oscillating signal by the sample signal to provide a modulated signal.

12. A system according to claim 11, further comprising
means for detecting each zero-crossing of the modulated signal and for providing a second clock signal in response to each detected said zero-crossing;
means responsive to the second clock signals for generating a ramp signal that increases in amplitude from zero between successive said second clock signals;
means for sampling the amplitude of the ramp signal in response to the second clock signals and for providing a second sample signal that is held at the sampled amplitude of the ramp signal until reset in response to the next second clock signal; and
means responsive to the second sample signal for providing a demodulated signal having an amplitude that is inversely proportional to the amplitude of the second sampled signal.

13. A system according to claim 11, further comprising means for detecting each amplitude peak of the modulated signal and for providing a demodulated signal having an amplitude that is held at a value which is proportional to the peak amplitude of the modulated signal until the next said amplitude peak is detected.

14. A system according to claim 1,
wherein the input signal is a binary signal;
wherein the sampling means comprises means for storing the state of the binary signal in response to each of a series of clock signals; and
wherein the modulating means comprises
means coupled to the sampling means for providing a uniform-peak-amplitude oscillating signal having a half-cycle that is one of two predetermined durations in accordance with the stored state of the binary signal;
means responsive to the oscillating signal for providing a said clock signal upon each zero-crossing of the oscillating signal; and
means coupled to the sampling means for attenuating the amplitude of the oscillating signal during the longer half-cycle durations of the oscillating signal to provide a modulated signal for which the product of the peak amplitude and the half-cycle duration is a constant notwithstanding the value of the binary signal.

15. A system according to claim 14, further comprising
means for detecting each amplitude peak of the modulated signal and for providing a detected signal having an amplitude that is held at a value that is proportional to the peak amplitude of the modulated signal until the next amplitude peak is detected; and
means for comparing the amplitude of the detected signal to a predetermined threshold value and for providing a demodulated signal having a binary state determined by whether the amplitude of the detected signal is more or less than the predetermined threshold value.

16. A system according to claim 14, further comprising
means for detecting each zero-crossing of the modulated signal and for providing a second clock signal in response to each detected zero crossing;
means responsive to the second clock signals for generating a pulse train in which the pulses each have a duration that is approximately the average of the two predetermined half-cycle durations; and
means for sampling the amplitude of the generated pulse train in response to the second clock signals and for providing a demodulated signal having a binary state determined by whether or not the previously generated pulse in the pulse train had expired prior to the onset of the present clock signal.

17. A system according to claim 1,
wherein the sampling means comprise
first means for sampling the amplitude of the input signal in response to a series of first clock signals and for providing a first sample signal that is held at the sampled amplitude of the input signal until reset in response to the next first clock signal; and
second means for sampling the amplitude of the input signal in response to a series of second clock signals and for providing a second sample signal that is held at the sampled amplitude of the input signal until reset in response to the next second clock signal; and
wherein the modulating means comprise
means alternately responsive to either the first sample signal or the second sample signal for providing a uniform-peak-amplitude oscillating signal having a quarter-cycle duration that is proportional to the amplitude of the respective first or second sample signal;
means responsive to the oscillating signal for providing a said first clock signal upon each amplitude peak of the oscillating signal;
means responsive to the oscillating signal for providing a said second clock signal upon each zero-crossing of the oscillating signal;
means for causing the oscillating signal means to be responsive to the first sample signal from when a said second clock signal is provided until the next first clock signal is provided and to be responsive to the second sample signal from when a said first clock signal is provided until the next second clock signal is provided;
means for averaging the first and second sample signals to provide an averaged signal;
means for delaying either the first clock signals or the second clock signals;
means for sampling the amplitude of the averaged signal in response to a series of the delayed clock signals, and for providing a third sample signal that is held at the sampled amplitude of the averaged signal until reset in response to the next delayed clock signal;
means responsive to the third sample signal for providing an inverse signal having an amplitude that is inversely proportional to the amplitude of the third sample signal; and
means for multiplying the oscillating signal by the inverse signal to provide a modulated signal that is modulated every quarter cycle.

18. A system according to claim 17, further comprising
means for detecting each zero-crossing of the modulated signal;
means for detecting each amplitude peak of the modulated signal;
means for generating a fourth clock signal in response to each detected zero-crossing of the modulated signal and each detected amplitude peak of the modulated signal;
means responsive to the fourth clock signals for generating a ramp signal that increases in amplitude from zero between successive said fourth clock signals; and
means for sampling the amplitude of the ramp signal in response to the fourth clock signals and for providing a demodulated signal that is held at the sampled amplitude of the ramp signal until reset in response to the next fourth clock signal.

19. A system according to claim 1,
wherein the sampling means comprise
first means for sampling the amplitude of the input signal in response to a series of first clock signals and for providing a first sample signal that is held at the sampled amplitude of the input signal until reset in response to the next first clock signal; and
second means for sampling the amplitude of the input signal in response to a series of second clock signals and for providing a second sample signal that is held at the sampled amplitude of the input signal until reset in response to the next second clock signal; and wherein the modulating means comprise means responsive to the first and second sample signal for providing first and second inverse signals having amplitudes that are inversely proportional to the respective amplitudes of the first and second sample signals;

means alternately responsive to either the first inverse signal or the second inverse signal for providing a uniform-peak-amplitude oscillating signal having a quarter-cycle duration that is proportional to the amplitude of the respective first or second inverse signal;

means responsive to the oscillating signal for providing a said first clock signal upon each amplitude peak of the oscillating signal;

means responsive to the oscillating signal for providing a said second clock signal upon each zero-crossing of the oscillating signal;

means for causing the oscillating signal means to be responsive to the first inverse signal from when a said second clock signal is provided until the next first clock signal is provided and to be responsvie to the second inverse signal from when a said first clock signal is provided until the next second clock signal is provided;

means for averaging the first and second sample signals to provide an averaged signal;

means for delaying either the first clock signals or the second clock signals;

means for sampling the amplitude of the averaged signal in response to a series of the delayed clock signals, and for providing a third sample signal that is held at the sampled amplitude of the averaged signal until reset in response to the next delayed clock signal; and means for multiplying the oscillating signal by the third sample signal to provide a modulated signal that is modulated every quarter cycle.

20. A system according to claim 19, further comprising means for detecting each zero-crossing of the modulated signal;

means for detecting each amplitude peak of the modulated signal;

means for generating a fourth clock signal in response to each detected zero-crossing of the modulated signal and each detected amplitude peak of the modulated signal;

means responsive to the fourth clock signals for generating a ramp signal that increases in amplitude from zero between successive said fourth clock signals;

means for sampling the amplitude of the ramp signal in response to the fourth clock signals and for providing a fourth sampled signal that is held at the sampled amplitude of the ramp signal until reset in response to the next fourth clock signal; and means responsive to the fourth sampled signal for providing a demodulated signal having an amplitude that is inversely proportional to the amplitude of the fourth sampled signal.

* * * * *